United States Patent Office 3,446,893
Patented May 27, 1969

3,446,893
SOLID DEODORIZING COMPOSITIONS
William E. Hanford, New York, N.Y., and Benjamin Newman, New Haven, Conn., assignors to Olin Mathieson Chemical Corporation, a corporation of Virginia
No Drawing. Continuation-in-part of application Ser. No. 469,339, July 2, 1965. This application Feb. 23, 1967, Ser. No. 617,809
Int. Cl. A61l 9/00; C11d 7/54
U.S. Cl. 424—76           15 Claims

ABSTRACT OF THE DISCLOSURE

Composition and method for deodorizing air spaces, for example, in water closets. The composition comprises (1) a solid source of available halogen, (2) a solid gas-generating source reactive with water to generate a gas and (3) a solid polyolefin.

---

This application is a continuation-in-part of co-pending U.S. Ser. No. 469,339 filed July 2, 1965, now abandoned.

This invention relates to new and improved deodorizing compositions and to the process of using them. More particularly, it relates to solid compositions containing available halogen, an effervescent couple and solid polyolefin. When these compositions are placed in water, they float. The gases formed by reaction between the water and the components of the tablet are substantially completely delivered into the air space above the water and selectively react with the odorous vapors and thus deodorize the air in the air space. The novel product of this invention finds particular utility in the treatment of the air space in the bowl of water closets, in bedpans and in other and larger locations.

Various compositions of the prior art have been prepared and added to the water in water closets for the purposes of sanitizing and disinfecting the aqueous content. Such compositions contain a sanitizing agent which is dispersed in the water and acts in the water to sanitize the water. Known compositions for these purposes have no discernible effect on the air space above the water which is usually malodorous and repulsive. Effervescent compositions, particularly tablets, have been proposed where the purpose of the effervescent couple is to promote rapid disintegration of the tablet in water and rapid dissolution of the germicidal agents in the water. The tablets of British Patent 955,897 and U.S. Patent 3,120,378, for example, have been found to be heavier than water and lie on the bottom of the container while they react with the water. All the sanitizing agent remains dispersed in the water and never reaches the air space above the water. The gases are effectively scrubbed by passage through the water and any chlorinous, deodorizing components of the gases never reach the air space above the water. They are ineffective to supply any significant amount of deodorizing material to the air space above the body of water to which they are added and they are ineffective to deodorize the air space. The incorporation of magnesium carbonate, suggested as a floatable component of certain available chlorine compositions in U.S. Patent 3,236,726, forms an unattractive scum on the surface of the water. The purpose of this film is to keep the chlorine in the water phase for stain-removing purposes and to lengthen the period of chlorination without substantial escape of the vapors to the air. Insofar as the chlorine is kept in the water, it is not delivered into the air space and is substantially ineffective in deodorizing the air space above the water.

One object of this invention is to provide compositions useful for deodorizing air spaces.

A further object is to provide compositions reactive with water to generate deodorizing gases and to deliver them substantially completely into the air space to be deodorized.

An additional object is to provide deodorizing compositions which instantly and thoroughly deodorize air spaces.

A still further object is to provide compositions in convenient and effective form for deodorizing air spaces.

Another object is to provide compositions which float on or near the top of the body of water to which they are added to deliver deodorizing gases into the air space above the water.

Other and further objects appear in the following description.

In contrast to the compositions of the prior art which sanitize the water only, the compositions of the present invention float on the surface of the body of water to which they are added. They are instantly reactive with water to generate chlorinous gases and to deliver them substantially completely to the air space above the body of water to which they are added. The chlorinous gases instantly and completely deodorize the air space and keep it deodorized as necessary. Compositions of the prior art which, when added to water, sink to the bottom and react to form gaseous products, deliver their gases at the bottom where they are scrubbed in ascending through the water. Any sanitizing agent therein is retained by and is active in the water but substantially no sanitizing gas is delivered to the air space above the water and they are ineffective to deodorize the air space.

In using the compositions of this invention, a suitable portion of the composition is added to the toilet bowl preferably immediately prior to use. Reaction with the water starts immediately and continues during normal use. The composition reacts and delivers chlorinous gases to the air space above the water and the chlorinous gases react with odorous materials, for example, hydrogen sulfide in the air space to convert it to non-odorous products. The chlorinous gases thus sweeten and deodorize the air space.

To accomplish the above objects, to remove hydrogen sulfide and other odorous gases from air and generally to deodorize an air space, the compositions of the present invention are provided. These compositions are distinguished from prior art compositions in immediately producing chlorinous gases when added to water and delivering the chlorinous gases into the air space by the floating action of the compositions of the present invention rather than dissolving largely in water. The chlorinous gases are produced in quantities sufficient to deodorize quickly and thoroughly the offensive gases in the air space, for example, in the toilet bowl when in use. The composition of the chlorinous gases is not certainly known and probably includes chlorine, chlorine monoxide and other components. The term "halogenous gases" as used herein is understood to include such gases and gases so generated even though their total composition is not certainly known.

The compositions of this invention comprise (1) a solid source of available halogen; (2) a solid gas-generating source reactive with water to generate a gas; and (3) solid polyolefin.

The solid source of available chlorine is suitably any of a wide variety of available chlorine compounds, including both organic and inorganic types. Suitable organic available chlorine compounds include particularly the N-chloro compounds, for example, the chloroisocyanurates, dichloroisocyanuric acid, trichloroisocyanuric acid, sodium, potassium and calcium dichloroisocyanurates and other dichloroisocyanuric acid salts, including heavy metal salts, double salts and mixtures thereof. Other suitable N-chloro-organics include 1,3-dichloro-5,5-dimethylhydantoin, chloramine T, dichloramine T, N-chlorosuccinimide, N,N'-dichlorobenzoylene urea, trichloromelamine, 1,3,4,6-tetrachloroglycoluril and other organic available chlorine compounds.

A preferred solid source of available chlorine for the purposes of this invention is an inorganic hypochlorite, and, more particularly, alkali metal and alkaline earth hypochlorites including magnesium hypochlorite. The alkali metal hypochlorites include particularly lithium hypochlorite both anhydrous and monohydrate, and solid forms of sodium hypochlorite including partially chlorinated caustic, e.g., NaOCl.3NaOH and chlorinated trisodium phosphate, $Na_3PO_4.\frac{1}{3}NaOCl.11\frac{2}{3}H_2O$. Neutral alkaline earth metal hypochlorites include calcium hypochlorite, barium hypochlorite, strontium hypochlorite and magnesium hypochlorite. Basic calcium hypochlorites are suitable, including hemibasic and dibasic having the formulas $Ca(OCl)_2.\frac{1}{2}Ca(OH)_2$ and $$Ca(OCl)_2.2Ca(OH)_2$$

respectively. Also suitable in some compositions is chlorinated lime having the approximate formula $$Ca(OCl)_2.CaCl_2.Ca(OH)_2.2H_2O$$

The solid source of available chlorine is suitably any of the types disclosed but the hypochlorites, in general, liberate available chlorine at a faster rate than the N-chloro-compounds in the environment here used. The use of twice or three times the proportion of N-chlorocompound usually compensates for the slower liberation rate and makes the N-chloro-compounds satisfactory. The N-chloro-compounds are more expensive per unit of available chlorine than many of the hypochlorites, particularly calcium hypochlorite, and these compositions are more expensive to manufacture than those based on the hypochlorites. The effectiveness of the N-chloro-compounds in the present environment is also increased by addition of acid to the compositions or to the water to which the compositions are added. Addition of acid to the water requires a separate operation and also increases the cost.

Alkali metal hypochlorites, particularly lithium hypochlorite and sodium hypochlorite, are effective sources of available chlorine and, in the environment here used, liberate chlorinous gases more rapidly than the N-chlorocompounds. Of the alkaline earth metal hypochlorites, magnesium, barium and strontium hypochlorites liberate their available chlorine readily, although they are more expensive than calcium hypochlorite. Basic calcium hypochlorites and chlorinated lime have low available chlorine contents compared with high test calcium hypochlorite and require additional acid to neutralize their alkalinity..

For the above reasons, high test calcium hypochlorite is the preferred hypochlorite in the compositions of this invention. It has the advantages of lowest cost, highest available chlorine content, most rapid liberation of chlorinous gases, stability and commercial availability.

In order to provide in the compositions of this invention suitable proportions of effervescent couple and polyolefin as well as desirable but lesser amounts of lubricants, stabilizers, desiccants and other ingredients, it is advantageous to use alkali metal or alkaline earth metal hypochlorites of high available chlorine content as the source of that component. Calcium hypochlorite as commercially available containing 70 percent or more available chlorine is especially advantageous for this additional reason.

A particularly preferred alkaline earth metal hypochlorite suitable for the purpose of the present invention is calcium hypochlorite containing 70 percent or more of available chlorine. Hypochlorite fines are useful in the present invention and are obtained as a by-product in the manufacture of granular material which is sold commercially. However, other grades of calcium hypochlorite are useful and the granular material can be reduced to fines by comminution. Preferably the calcium hypochlorite contains at least 25 percent finer than 100 mesh (U.S. Standard Screens) and none coarser than 30 mesh. Calcium hypochlorite compositions containing over 35 percent or more of available chlorine are especially suitable for use in the compositions of the present invention.

Suitable powdered calcium hypochlorite, known as HTH fines has, for example, the screen analysis shown below:

| Screen: | Weight percent |
|---|---|
| 50 mesh | 0.4 |
| 70 mesh | 18.9 |
| 100 mesh | 33.4 |
| 200 mesh | 29.3 |
| Through 200 mesh | 18.0 |
| | 100.0 |

A suitable solid gas-generating source is stable and non-reactive when mixed with the available chlorine compound used in any particular composition of this invention and the solid gas-generating source is reactive with water to generate a gas. The gas acts as a carrier for the chlorinous gases from the available chlorine compound into the air space. Although any gas-generating source compatible with the available chlorine compound is suitable, the preferred gas-generating source contains a solid carbonate and a solid acid. In contact with water, these react instantly to generate carbon dioxide gas. Preferred carbonates are the alkali metal and alkaline earth metal carbonates and bicarbonates including sodium carbonate, sodium bicarbonate, potassium bicarbonate lithium bicarbonate, rubidium carbonate, cesium bicarbonate, sodium potassium carbonate, calcium carbonate and magnesium carbonate.

Suitable solid acids are organic or inorganic and include solid organic carboxylic acids and solid acid salts, for example, oxalic, succinic, tartaric, citric, gluconic, malic, malonic, maleic, phthalic and p-toluene sulfonic acids and sodium acid citrate, potassium bitartrate, potassium acid phthalate, sodium acid oxalate, rubidium acid tartrate, cesium acid tartrate and lithium acid citrate. Chloroisocyanuric acids also suitably serve as the acid component. Suitable solid acid compounds also include solid inorganic acids and solid acid salts, for example, potassium dihydrogen phosphate, sodium dihydrogen phosphate, sodium dihydrogen pyrophosphate ($Na_2H_2P_2O_7$), sulfamic acid and sodium bisulfate. Another suitable solid acidic compound is ammoniated $P_2O_5$, an ammonium polyphosphate-coated $P_2O_5$, sold under the trade name "$N-P_2O_5$."

The preferred couple is citric acid and sodium bicarbonate.

The carbonate and the acidic compound are suitably used in a wide range of relative proportions. The acidic compound is preferably used in amounts of from 2.5 to 25 percent by weight of the total composition, with approximately an equal weight of sodium bicarbonate when used or about half its weight when sodium carbonate is used or proportional amounts of other carbonates or bicarbonates. The total proportion of gas-generating source in the compositions of the present invention are preferably from about 5 to 50 percent by weight of the total composition.

The solid polyolefin component of the compositions of the present invention is suitably a solid polyolefin or a solid polydiolefin or solid co-polymers thereof. Suitable solid co-polymers have a major proportion of olefin or diolefin units but also contain a minor proportion of vinyl monomer units. Such solid polyolefins are usually waxy or rubbery but all are of low density and substantially inert to available chlorine compounds. Particular examples include polyethylene, polypropylene and polybutadiene, Commercially available polyethylene or polypropylene are preferred. Either the commercially available finely powdered polyethylene or the microfine polyethylene consisting of spherical particles of under 20 micron size are especially suitable. Polypropylene, commercially available as powder or fiber, is suitable. The polyolefin content of the compositions of this invention is sufficient to insure that the compositions float while reacting with water. Although polyolefin content is preferably from about 10 to 50 percent by weight of the total composition, less than 10 percent of especially low-density polyolefin is sufficient in combination with other light weight components, to produce compositions which float on water. More than 50 percent polyolefin is suitable when small proportions of available chlorine compounds, effervescent couple and other ingredients in lesser amounts are present in the composition. For these reasons, it is desirable, in some compositions of the invention, to use proportions outside the limits of the preferred range.

The solid polyolefins used in the compositions of this invention have outstanding and unpredictable advantages over any other materials for the purpose. The solid polyolefins have low density and are effective in floating the compositions on water. The solid polyolefins are odorless, inert and stable to available halogen compounds. They are especially advantageous in being resilient and contributing lubricating properties to compositions of the invention when produced in tablet form. In other compositions in non-tablet form, the solid polyolefins contribute advantageous non-dusting properties.

The compositions of this invention contain the three principal components and the minor components, when present, in a wide range of relative proportions and all of these compositions are useful and effective in varying environments. For many purposes, the compositions of this invention contain advantageously from about 1 to 40 percent by weight of available chlorine, from about 5 to 50 percent by weight of the solid gas-generating source and from about 10 to 50 percent by weight of polyolefin. The proportion of available chlorine source varies according to the available chlorine content of the source. For example, 7 percent of available chlorine in the final composition requires the incorporation therein of 10 percent of high test calcium hypochlorite containing 70 percent available chlorine. The preferred proportion of available chlorine in the compositions of this invention, when using calcium hypochlorite as the source of available chlorine, is about 1 to 10 percent by weight of available chlorine.

In addition to the three major components of the composition of the present invention, namely (1) a solid source of available chlorine, (2) a solid gas-generating source reactive with water to generate a gas and (3) a solid polyolefin, it is usually desirable to include minor ingredients in lesser amounts. These minor ingredients include diluent salts, desiccants, binders, fillers, lubricants, disintegrants, pigments and perfumes.

Suitable diluent salts, when used, are water-soluble inorganic salts which are non-reactive with calcium hypochlorite and which do not adversely affect its stability. Sodium chloride and sodium nitrate are especially useful as diluent salts which are stable to and otherwise compatible with calcium hypochlorite and other available chlorine compounds. Both of these salts are advantageously readily soluble in water and facilitate rapid dissolution of the effervescent compositions of the present invention in tablet form when they are added to a body of water. Other suitable diluent salts include, for example, sodium chlorate, potassium chlorate, potassium chloride, potassium nitrate and lithium chloride. The inclusion of a chloride, for example, sodium chloride or potassium chloride, is preferred since chlorides seem to improve the deodorizing ability of the evolved gases. The proportion of diluent salts, when included, is suitably up to about 15 percent. The diluent salts, when used, need not meet particular fineness specifications as this is not critical. However, the added diluent salt should preferably pass 30 mesh but may be all retained on 100 mesh. The so-called "butterflake" salt having an apparent density of 0.7 to 0.9 is suitable. Microfine salt is an advantageous form of salt in many compositions of this invention.

The inclusion of a solid, substantially neutral desiccant in the composition is desirable to prevent premature decomposition of the composition by atmospheric moisture. However, where individual portions are packaged in impervious plastic envelopes or sealed between sheets of plastic, the amount of desiccant is suitably reduced and can be eliminated. When used, the desiccant is suitably from about 15 to 30 percent by weight of the composition. Suitable desiccants include Drierite (anhydrous calcium sulfate), alumina and silica gel.

Suitable lubricants include stearic acid and the stearates of sodium, lithium, magnesium, zinc and aluminum and conventional lubricants especially appropriate for tabletting the compositions of this invention. Carboxymethyl cellulose, hydroxyethyl cellulose and CMHEC 37M, a mixed carboxymethyl-hydroxyethyl cellulose are other suitable lubricants. CMHEC 37M also acts as a binder but other suitable binders are also useful.

Suitable binders include, for example CMHEC 37M, hydroxypropylcellulose, hydroxyethylcellulose, methyl vinyl ether-maleic anhydride co-polymers, polyethylene glycol polymers, chlorinated polypropylene, polyvinylpyrrolidone, acacia gum and agar.

A particularly desirable filler, conferring good tabletting properties to the composition is "Cab-O-Sil," a silica which is finely-divided to submicron size particles.

Suitable pigments include Monarch Blue Toner, a phthalocyanine blue, as well as the inorganic pigments, for example, chromium oxide ($Cr_2O_3$) and cosmetic green.

Inclusion of a perfume is usually desirable. Pine type or floral odors are suitable. Particularly suitable is a banana (ester-type) odor. Advantageously, the perfume is adsorbed on a suitable salt or adsorbent clay, for example, Microcel E, a finely divided hydrous calcium silicate.

The compositions of this invention are produced in any suitable form, including powders, granular mixtures, tablets and any other desired form. Tablets are preferred for convenience in handling, packaging and use in appropriate dosages. To provide satisfactory tabletting conditions, for example, freedom from sticking and pitting and to provide tablets having adequate strength and stability, it is advantageous to include in the compositions of this invention binders, fillers and lubricants.

In tabletting the compositions of this invention, it is advantageous for the ingredients to have a range of particle size, suitably from 30 mesh through 200 mesh. All of one ingredient can have a narrow range of particle sizes provided other ingredients provide the desirable over-all distribution of particle sizes. HTH fines or microfine polyethylene conveniently supply the finer ingredients. The diluent salt and citric acid need not be so fine but, for satisfactory tabletting, all should pass 30 mesh and at least 10 percent should pass 100 mesh.

Tabletting is accomplished in any of the commercially available machines, suitably at pressures of about 5000 to 80,000 p.s.i. or higher. Lower pressures generally result in fragile tablets which do not adequately withstand ordinary handling and shipping. The higher pressures are suitable with larger proportions of polyolefin but generally pressures in the middle of the recited range, from 10,000 to 50,000, are preferred. Too little polyolefin may result in non-floating tables but satisfactory, floating tablets are produced when additional polyolefin is blended in or when tabletting pressures are reduced, or both.

Tablets are suitably marketed in bulk, in glass bottles, plastic tubes or any other suitable containers. The tablets are also suitably enclosed between sheets of plastic or aluminum foil, in plastic bags, for example, of polyethylene, in bags formed from laid fibers or in any other suitable packages. The tabletted compositions of this invention are safe, stable and strong.

Compositions of this invention in non-tablet form, for example, in powdered or granular form are conveniently dispensed in any suitable containers, for example, glass bottles, polyethylene bottles or polyethylene-lined metal containers, advantageously fitted with dispensing and/or measuring features for proper dosage. Additionally powders are arranged in pockets between sheets of plastic which is water-permeable or water-impermeable or between sheets of aluminum foil. These are readily torn open and the contents placed in use. These compositions are conveniently packaged and carried in pocket or purse for handy use.

In the following examples, all parts are parts by weight.

EXAMPLE I

HTH, a commercial calcium hypochlorite containing 70 percent of available chlorine, was used in the preparation of this composition. A mixture of 91 parts by weight of HTH fines and 4 parts of Cab-O-Sil M–5, a lubricant and filler was thoroughly blended in a twin shell blender to form a homogeneous HTH mix. Separately, 136 parts of powdered sodium bicarbonate and 4 parts of Cab-O-Sil were blended to form a bicarbonate mix. Separately, a mixture of 182 parts of citric acid and 4 parts of Cab-O-Sil was blended to form a citric acid mix.

To 12 parts of Microcel E, an adsorbent, was added 3 parts of ester-type perfume having a banana-like odor and the mixture was thoroughly blended. Then 8 parts of Cab-O-Sil was blended in to form the perfume mix.

A mixture of 164 parts of microfine polyethylene, 4 parts of Cab-O-Sil, 6 parts of Microcel and 91 parts of finely ground salt (NaCl) was thoroughly blended and then 18 parts of Monarch Blue Toner, a phthalocyanine type pigment was blended in. Successively, in order, were added the perfume mix, 91 parts of CMHEC 37M (a carboxymethyl-hydroxyethyl cellulose binder and lubricant), the bicarbonate mix, 182 parts of −40 mesh Drierite (a calcium sulfate desiccant), the citric acid mix and finally the HTH mix. After each addition the mixture was thoroughly blended.

The resulting composition was tabletted in a tabletting machine with a die having a diameter of 5/8 inch under a pressure of 22,800 p.s.i. The tablets weighed about 1 gram each.

When one of the tablets was added to 1500 ml. of water at 15° C., it floated and disintegrated in about 5 to 10 minutes. In another test, the available chlorine content of the air space above the water to which a tablet was added was measured by aspirating air above the air space into aqueous potassium iodide and titrating with standard thiosulfate. The following results were calculated on the basis of the release of the available chlorine into 10 liters of air:

Time, min.: Av. Cl., p.p.m.
0.5 _____ 8
1 _____ 16
2 _____ 32
4 _____ 59
6 _____ 68
8 _____ 68
10 _____ 68

For the designed purpose, one tablet added to the toilet bowl in actual use maintains the air space in the bowl completely inoffensive.

EXAMPLE II

HTH, a commercial calcium hypochlorite containing 70 percent of available chlorine, was used in the preparation of this composition. A mixture of 91 parts by weight of HTH fines and 10 parts of Cab-O-Sil M–5, a lubricant and filler was thoroughly blended in a twin shell blender to form a homogeneous HTH mix. Separately, 136 parts of powdered sodium bicarbonate and 10 parts of Cab-O-Sil were blended to form a bicarbonate mix. Separately, a mixture of 182 parts of citric acid and 10 parts of Cab-O-Sil was blended to form a citric acid mix.

A mixture of 164 parts of powdered polyethylene, 13 parts of Cab-O-Sil, 20 parts of Microcel and 91 parts of finely ground salt (NaCl) was thoroughly blended. To this polyethylene blend were added, successively, in order, 91 parts of CMHEC 37M (a carboxymethyl-hydroxyethyl cellulose binder and lubricant), 182 parts of −40 mesh Drierite (a calcium sulfate desiccant), the bicarbonate mix, the citric acid mix and finally the HTH mix. After each addition the mixture was thoroughly blended.

The resulting composition was tabletted in a tabletting machine with a die having a diameter of ½ inch under a pressure of 19,400 p.s.i. The tablets weighed about 0.75 gram each.

When one of the tablets was added to 1500 ml. of water at 15° C., it floated and disintegrated in about 5 to 10 minutes. In another test, the available chlorine content of the air space above the water to which a tablet was added was measured as in Example I with the following results:

Time, min.: Av. Cl., p.p.m.
0.25 _____ 2.4
0.5 _____ 10.4
1 _____ 16.1
2 _____ 28.0
3 _____ 43.6
4 _____ 58.6
5 _____ 62.2
10 _____ 63.5

EXAMPLE III

HTH, a commercial calcium hypochlorite containing 70 percent of available chlorine, was used in the preparation of this composition. A mixture of 70 parts by weight of HTH fines and 11 parts of Cab-O-Sil M–5, a lubricant and filler was thoroughly blended in a twin shell blender to form a homogeneous HTH mix. Separately, 130 parts of powdered sodium bicarbonate and 9 parts of Cab-O-Sil were blended to form a bicarbonate mix. Separately, a mixture of 163 parts of citric acid and 9 parts of Cab-O-Sil was blended to form a citric acid mix.

A mixture of 300 parts of powdered polyethylene, 6 parts of Cab-O-Sil, 15 parts of Microcel and 41 parts of finely ground salt (NaCl) was thoroughly blended. To this polyethylene blend was then added successively, in order, 45 parts of CMHEC 37M (a carboxymethyl-hydroxyethyl cellulose binder and lubricant), the bicarbonate mix, 146 parts of −40 mesh Drierite (a calcium sulfate desiccant), the citric acid mix and the HTH mix. Finally 45 parts of stearic acid and 10 parts of lithium stearate were blended in as lubricants. After each addition the mixture was thoroughly blended.

A portion of the resulting composition was tabletted in a tabletting machine with a die having a diameter of ½ inch under each of two pressures 35,700 and 40,800 p.s.i. The tablets weighed about 0.75 gram each.

When one of the tablets was added to 1500 ml. of water at 15° C., it floated and disintegrated in about 5 to 10 minutes. In another test, the available chlorine content of the air space above the water to which a tablet was added measured as in Example I with the following results:

| Time, min. | Av. Cl., p.p.m. | |
| --- | --- | --- |
| | Tabletted at 40,800 p.s.i. | Tabletted at 35,7000 p.s.i. |
| 0.25 | 0.0 | 3.0 |
| 0.5 | 0.8 | 9.1 |
| 1 | 4.2 | 19.4 |
| 2 | 6.1 | 34.4 |
| 3 | 8.7 | 41.1 |
| 4 | 10.0 | 43.1 |
| 5 | 12.1 | 43.2 |
| 10 | 16.5 | 46.0 |

EXAMPLE IV

HTH, a commercial calcium hypochlorite containing 70 percent of available chlorine, was used in the preparation of this composition. A mixture of 70 parts by weight of HTH fines and 11 parts of Cab-O-Sil M-5, a lubricant and filler was thoroughly blended in a twin shell blender to form a homogeneous HTH mix. Separately, 130 parts of powdered sodium bicarbonate and 9 parts of Cab-O-Sil were blended to form a bicarbonate mix. Separately, a mixture of 163 parts of citric acid and 9 parts of Cab-O-Sil was blended to form a citric acid mix.

A mixture of 300 parts of powdered polyethylene, 6 parts of Cab-O-Sil, 15 parts of Microcel and 41 parts of finely ground salt (NaCl) was thoroughly blended. To this polyethylene blend was then added 45 parts of CMHEC 37M ( a carboxymethyl-hydroxyethyl cellulose binder and lubricant), the bicarbonate mix, 146 parts of −40 mesh Drierite (a calcium sulfate desiccant), the citric acid mix and the HTH mix. Finally 45 parts of sodium stearate and 10 parts of lithium stearate lubricants were blended in. After each addition the mixture was thoroughly blended.

The resulting composition was tabletted in a tabletting machine with a die having a diameter of ½ inch under pressures up to 40,800 p.s.i. The tablets weighed about 0.75 gram each. When one of the tablets was added to 1500 ml. of water at 15° C., it floated and disintegrated in about 5 to 10 minutes. In another test, the available chlorine content of the air space above the water to which a tablet was added was measured as described in Example I with the following results:

| Time, min.: | Av. Cl., p.p.m. |
| --- | --- |
| 0.5 | 3.5 |
| 1 | 7.5 |
| 2 | 15.7 |
| 5 | 23.6 |
| 10 | 25.5 |

EXAMPLE V

The procedure of Example IV was repeated using the same proportions of the same ingredients except that tartaric acid was substituted for citric acid. A satisfactory tablet of essentially the same properties and behavior in actual use was produced.

EXAMPLE VI

HTH, a commercial calcium hypochlorite containing 70 percent of available chlorine, was used in the preparation of this composition. A mixture of 100 parts by weight or HTH fines and 5 parts of Cab-O-Sil M-5, a lubricant and filler was thoroughly blended in a twin shell blender to form a homogeneous HTH mix. Separately, 150 parts of powdered sodium bicarbonate and 5 parts of Cab-O-Sil were blended to form a bicarbonate mix. Separately, a mixture of 5 parts of Cab-O-Sil and 200 parts of ammoniated $P_2O_5$, an ammonium polyphosphate-coated $P_2O_5$, sold under the trade name, "N-$P_2O_5$" was blended to form an acid mix.

A mixture of 190 parts of powdered polyethylene, 5 parts of Cab-O-Sil, 20 parts of Microcel was thoroughly blended and then 20 parts of Monarch Blue Toner, a phthalocyanine type pigment was blended in. To this polyethylene blend was added 100 parts of CMHEC 37 M (a carboxymethyl-hydroxyethyl cellulose binder and lubricant), the bicarbonate mix, 200 parts of −40 mesh Drierite (a calcium sulfate desiccant), the acid mix and finally the HTH mix. After each addition the mixture was thoroughly blended.

The resulting composition was tabletted in a tabletting machine with a die having a diameter of ⅝ inch under a pressure of 22,800 p.s.i. The tablets weighed about 1 gram each.

When one of the tablets was added to 1500 ml. of water at 15° C., it floated and disintegrated in about 5 to 10 minutes. In another test, the available chlorine content of the air space above the water to which a tablet was added was measured as in Example I with the following results:

| Time, min.: | Av. Cl., p.p.m. |
| --- | --- |
| 0.25 | 1.5 |
| .5 | 11.3 |
| 1 | 47.6 |
| 2 | 141.2 |
| 3 | 243.7 |
| 4 | 310.1 |
| 5 | 346.6 |
| 10 | 426.1 |

EXAMPLE VII

To 20 parts of Microcel E, an adsorbent, was added 10 parts of floral-type perfume and the mixture was thoroughly blended. Then 20 parts of Cab-O-Sil was blended in. Successively, in order, were added 20 parts of Monarch Blue Toner, 180 parts of powdered polyethylene, 100 parts of CMHEC 37M, 200 parts of citric acid, 200 parts of −40 mesh Drierite, 150 parts of sodium bicarbonate and 100 parts of HTH fines. After each addition the mixture was thoroughly blended.

The resulting composition was tabletted in a tabletting machine with a die having a diameter of ⅝ inch under a pressure of 6,600 p.s.i. The tablets weighed about 1 gram each.

When one of the tablets was added to 1500 ml. of water at 7° C., it floated and disintegrated in about 6 minutes.

EXAMPLE VIII

To a portion of the blend, prior to tabletting, as prepared according to Example VII was added additional powdered polyethylene and Cab-O-Sil to increase the content of these ingredients and to decrease correspondingly the content of the other ingredients. The resulting blend has the following composition:

| Ingredient: | Parts by weight |
| --- | --- |
| Sodium bicarbonate | 70 |
| Citric acid | 70 |
| HTH | 70 |
| Microcel E | 7 |
| Polyethylene | 343 |
| Stearic acid | 139 |
| Drierite | 173 |
| Monarch Blue Toner | 14 |
| Perfume | 7 |
| Cab-O-Sil | 107 |
| Total | 1000 |

The resulting composition was tabletted in a tabletting machine with a die having a diameter of ⅝ inch under a pressure of 16,300 p.s.i. The tablets weighed about 1 gram each.

When one of the tablets was added to 1500 ml. of water at 7° C., it floated and disintegrated in about 5 to 10 minutes. In another test, the available chlorine content of the air space above the water to which a tablet was added was measured after 5 minutes as described in Example I and found to be 7.8 p.p.m.

EXAMPLE IX

To 18 parts of Microcel E, an adsorbent, was added 9 parts of floral-type perfume and the mixture was thoroughly blended. Then 18 parts of Cab-O-Sil was blended in. Successively, in order, were added:

|  | Parts |
|---|---|
| Powdered polyethylene | 291 |
| Monarch Blue Toner | 18 |
| Sodium dihydrogen phosphate | 9 |
| Stearic acid | 55 |
| Citric acid | 118 |
| Drierite (−50+100 mesh) | 182 |
| Powdered sodium bicarbonate | 118 |
| HTH fines | 27 |
| Calcium hypochlorite (70% available chlorine) | 46 |
| Finely ground sodium nitrate | 91 |

After each addition the mixture was thoroughly blended.

The resulting composition was tabletted in a tabletting machine with a die having a diameter of 5/8 inch under a pressure of 48,900 p.s.i. The tablets weighed about 1 gram each.

When one of the tablets was added to 1500 ml. of water at 17° C., it floated and disintegrated in about 1.5 minutes.

EXAMPLE X

A first mixture was prepared by blending 100 parts of HTH fines and 12.5 parts of Cab-O-Sil. To this was added successively 42.5 parts of Microcel, 300 parts of powdered polyethylene and 200 parts of sodium bicarbonate, blending thoroughly after each addition.

A second mixture was prepared by blending 200 parts of citric acid and 12.5 parts of Cab-O-Sil, then successively 42.5 parts of Microcel, 40 parts of stearic acid and 50 parts of anhydrous sodium sulfate.

Finally the first and second mixtures were blended together.

The resulting composition was tabletted in a tabletting machine with a die having a diameter of 5/8 inch under a pressure of 17,000 p.s.i. The tablets weighed about 2 grams each.

When one of the tablets was added to 1500 ml. of water at 3° C., it floated and disintegrated in about 5 to 6 minutes.

EXAMPLE XI

A mixture of 89 parts by weight of HTH fines and 12 parts of Cab-O-Sil M-5, a lubricant and filler was thoroughly blended in a twin shell blender to form a homogeneous HTH mix. Separately, 133 parts of powdered sodium bicarbonate and 10 parts of Cab-O-Sil were blended to form a bicarbonate mix. Separately, a mixture of 178 parts of citric acid and 10 parts of Cab-O-Sil was blended to form a citric acid mix.

A mixture of 161 parts of microfine polyethylene, 10 parts of Cab-O-Sil, 20 parts of Microcel and 89 parts of finely ground salt (NaCl) was thoroughly blended. To this polyethylene blend was added, successively, in order, 110 parts of CMHEC 37M (a carboxymethyl-hydroxyethyl cellulose binder and lubricant), the bicarbonate mix, 178 parts of 100 mesh activated alumina, the citric acid mix and finally the HTH mix. After each addition the mixture was thoroughly blended.

The resulting composition was tabletted in a tabletting machine with a die having a diameter of 1/2 inch under a pressure of 23,000 p.s.i. The tablets weighed about 0.75 gram each.

When one of the tablets was added to 1500 ml. of water at 6° C., it floated and disintegrated in about 5 minutes.

EXAMPLE XII

To 50 parts of sodium dihydrogen phosphate was added 10 parts of floral-type perfume and the mixture was thoroughly blended. Then 180 parts of powdered polypropylene was blended in. Successively, in order, were added:

|  | Parts |
|---|---|
| Monarch Blue Toner | 20 |
| Stearic acid | 40 |
| Citric acid | 200 |
| Drierite | 250 |
| Powdered sodium bicarbonate | 200 |
| HTH fines | 50 |

After each addition the mixture was thoroughly blended and after the addition of the HTH the whole was blended for 20 minutes.

The resulting composition was tabletted in a tabletting machine with a die having a diameter of 5/8 inch under a pressure of 9,800 p.s.i. The tablets weighed about 1 gram each.

When one of the tablets was added to 1500 ml. of water at 7° C., it floated while disintegrating and discharged the evolved gas into the air above the water.

EXAMPLE XIII

To 80 parts of microsized sodium chloride was added 10 parts of floral-type perfume and the mixture was thoroughly blended. Then 50 parts of sodium dihydrogen phosphate was blended in. Successively, in order, were added:

|  | Parts |
|---|---|
| Polypropylene fiber | 300 |
| Monarch Blue Toner | 20 |
| Stearic acid | 40 |
| Citric acid | 100 |
| 200 mesh Drierite | 250 |
| Powdered sodium bicarbonate | 100 |
| HTH fines | 50 |

After each addition the mixture was thoroughly blended and after the addition of the HTH the whole was blended for 20 minutes.

The resulting composition was tabletted in a tabletting machine with a die having a diameter of 5/8 inch under a pressure of 4,600 p.s.i. The tablets weighed about 1 gram each.

When one of the tablets was added to 1500 ml. of water at 7° C., it floated while disintegrating and discharged the evolved gas into the air above the water.

EXAMPLE XIV

The blending procedure of Example IX was repeated using the same proportions of the same ingredients except that 91 parts of CMHEC 37M was substituted for 91 parts of sodium nitrate.

The resulting composition was tabletted in a tabletting machine with a die having a diameter of 5/8 inch under a pressure of 65,100 p.s.i. The tablets weighed about 1 gram each.

When one of the tablets was added to 1500 ml. of water at 15° C., it floated and disintegrated in about 8 minutes. In another test, the available chlorine content of the air space above the water to which a tablet was added was measured after 10 minutes as described in Example I and found to be 6.8 p.p.m.

EXAMPLE XV

To 8 parts of Microcel was added successively, blending after each addition:

|  | Parts |
|---|---|
| Floral perfume | 8 |
| Cab-O-Sil | 8 |
| Powdered polyethylene | 230 |
| Monarch Blue Toner | 15 |
| Monosodium phosphate | 77 |
| Citric acid | 222 |
| Drierite, 200 mesh | 154 |
| Sodium bicarbonate | 100 |
| HTH fines | 63 |
| Stearic acid | 115 |

The resulting composition was tabletted at 9800 p.s.i. into 1 gram tablets, ⅝ inch in diameter. When one of the tablets was added to water at 15° C., it floated and disintegrated in five minutes.

EXAMPLE XVI

The tablets prepared as described in Example IV were crushed and screened. 0.75 gram of each sieve fraction was added separately to 1500 ml. of water at 15° C. and the available chlorine in the air space above the water was measured as described in Example I. Results were as follows:

| Fraction U.S. standard sieves | Chlorine, p.p.m. in 10 liters Air | | | |
|---|---|---|---|---|
| | 30 sec. | 2 min. | 5 min. | 10 min. |
| Thru 6 on 10 | 19 | 26 | 27 | 27 |
| Thru 10 on 14 | 21 | 26 | 27 | 29 |
| Thru 14 on 16 | 22 | 25 | 28 | 30 |
| Thru 16 on 20 | 26 | 32 | 34 | 36 |
| Thru 20 on 30 | 20 | 24 | 25 | 27 |
| Thru 30 on 40 | 28 | 41 | 44 | 47 |
| Thru 40 on 70 | 36 | 53 | 58 | 61 |
| Thru 70 on 100 | 29, 42 | 39, 59 | 43, 65 | 44, 66 |

EXAMPLE XVII

One gram of the powdered mixture prepared as described in Example IV and prior to tabletting was added to 1500 ml. of water at 15° C. and the available chlorine in the air space was measured with the following results:

| Time: | Chlorine, p.p.m. in 10 L. of air |
|---|---|
| 30 sec. | 11 |
| 2 min. | 20 |
| 5 min. | 23 |
| 10 min. | 25 |

EXAMPLE XVIII

A base formula was prepared by blending thoroughly the following ingredients in the proportions indicated:

| Ingredient: | Parts by weight |
|---|---|
| $NaHCO_3$, powder | 628.0 |
| Microcel E | 72.5 |
| NaCl, microsized | 198.1 |
| Polyethylene powder | 1449.2 |
| Cab-O-Sil M-5 | 169.1 |
| Carboxymethylhydroxyethylcellulose 37M, −70 mesh | 217.4 |
| Sodium stearate | 217.4 |
| Lithium stearate | 48.3 |
| Total | 3000.0 |

A composition of the invention was prepared by thoroughly blending a portion of the above base formula with additional ingredients in the proportions indicated:

| Ingredient: | Parts by weight |
|---|---|
| Base formula | 62.10 |
| Citric acid powder | 8.15 |
| Citric acid, fine granular | 8.15 |
| Drierite, −40 mesh | 7.60 |
| LiOCl (2.3% $H_2O$, 26.27% av. Cl) | 14.00 |
| Total | 100.00 |

Tablets of the invention were formed from the above blend in a hand press at 6000 p.s.i. The tablets were 9/16 inch in diameter and weighed 0.75 gram each. The thickness was about ⅜ inch. (For comparative purposes in these examples, the thickness varied depending principally on the nature of the ingredients and the tabletting pressure while the diameter and weight of the tablets was kept constant.) Tested as described in Example I, a single tablet floated and disintegrated rapidly delivering to the air space 3 p.p.m. of available chlorine in 30 seconds and 15 p.p.m. in 10 minutes.

EXAMPLE XIX

A composition of the invention was prepared by blending thoroughly the following ingredients in the proportions indicated:

| Ingredient: | Parts by weight |
|---|---|
| Base formula of Example XVIII | 6.21 |
| Citric acid, powder | 3.09 |
| $Ca(OCl)_2 \cdot 2Ca(OH)_2$ (50% av. Cl) | 0.70 |
| Total | 10.00 |

Tabletted as described in Example XVIII and tested as described in Example I, a single tablet floated and disintegrated rapidly, delivering to the air space 8 p.p.m. of available chlorine in 30 seconds and 23 p.p.m. in 10 minutes.

EXAMPLE XX

A composition of the invention was prepared by blending thoroughly the following ingredients in the proportions indicated:

| Ingredient: | Parts by weight |
|---|---|
| Base formula | 62.10 |
| Citric acid, powder | 11.95 |
| Citric acid, fine granular | 11.95 |
| Chlorinated lime (36.3% av. Cl) | 14.00 |
| Total | 100.00 |

Tabletted as described in Example XVIII at 4000 p.s.i. and tested as described in Example I, a single tablet floated and disintegrated rapidly, delivering to the air space 7 p.p.m. in 30 seconds and 43 p.p.m. in 10 minutes.

EXAMPLE XXI

A composition of the invention was prepared by blending thoroughly the following ingredients in the proportions indicated:

| Ingredient: | Parts by weight |
|---|---|
| Base formula | 62.1 |
| Sodium dichloroisocyanurate | 10.0 |
| Citric acid, powder | 27.9 |
| Total | 100.0 |

Tabletted as described in Example XVIII at 7000 p.s.i. and tested as described in Example I, a single tablet floated and disintegrated rapidly, delivering to the air space 2 p.p.m. of available chlorine in 30 seconds and 9 p.p.m. in 10 minutes.

EXAMPLE XXII

A composition of the invention was prepared by blending thoroughly the following ingredients in the proportions indicated:

| Ingredient: | Parts by weight |
|---|---|
| Base formula | 62.1 |
| Citric acid, powder | 23.9 |
| "ACL-66" | 14.0 |
| Total | 100.0 |

"ACL-66" is a commercial product identified as [(mono-trichloro)tetra(monopotassium dichloro)] pentaisocyanurate.

Tabletted as described in Example XVIII at 7000 p.s.i. and tested as described in Example I, a single tablet floated and disintegrated rapidly, delivering to the air space 2 p.p.m. of available chlorine in 30 seconds and 10 p.p.m. in 10 minutes.

EXAMPLE XXIII

A composition of the invention was prepared by blending thoroughly the following ingredients in the proportions indicated:

| Ingredients: | Parts by weight |
| --- | --- |
| Base formula | 62.1 |
| Dichloroisocyanuric acid | 14.0 |
| Citric acid, fine granular | 23.9 |
| Total | 100.0 |

Tabletted as described in Example XVIII at 6000 p.s.i. and tested as described in Example I, a single tablet floated and disintegrated rapidly, delivering to the air space 1 p.p.m. of available chlorine in 30 seconds and 7 p.p.m. in 10 minutes.

EXAMPLE XXIV

A composition of the invention was prepared by blending thoroughly the following ingredients in the proportions indicated:

| Ingredients: | Parts by weight |
| --- | --- |
| Base formula | 62.1 |
| Trichloroisocyanuric acid | 14.0 |
| Citric acid, powder | 23.9 |
| Total | 100.0 |

Tabletted as described in Example XVIII at 8000 p.s.i. and tested as described in Example I, a single tablet floated and disintegrated rapidly, delivering to the air space 3 p.p.m. of available chlorine in 30 seconds and 17 p.p.m. in 10 minutes.

EXAMPLE XXV

A composition of the invention was prepared by blending thoroughly the following ingredients in the proportions indicated:

| Ingredients: | Parts by weight |
| --- | --- |
| Base formula | 62.1 |
| "Daxan" (Tetrachloroglycoluril) | 14.0 |
| $N$-$P_2O_5$ (Stabilized $P_2O_5$) | 23.9 |
| Total | 100.0 |

Tabletted as described in Example XVIII at 7000 p.s.i. and tested as described in Example I, a single tablet floated and disintegrated rapidly, delivering to the air space 1 p.p.m. of available chlorine in 30 seconds and 29 p.p.m. in 10 minutes.

EXAMPLE XXVI

A composition of the invention was prepared by blending thoroughly the following ingredients in the proportions indicated:

| Ingredients: | Parts by weight |
| --- | --- |
| Base formula | 62.1 |
| N-chlorosuccinimide | 14.0 |
| Citric acid, powder | 23.9 |
| Total | 100.0 |

Tabletted as described in Example XVIII at 6000 p.s.i. and tested as described in Example I, a single tablet floated and disintegrated rapidly, delivering to the air space 0.4 p.p.m. of available chlorine in 30 seconds and 2 p.p.m. in 10 minutes.

EXAMPLE XXVII

A composition of the invention was prepared by blending thoroughly the following ingredients in the proportions indicated:

| Ingredients: | Parts by weight |
| --- | --- |
| Base formula | 62.1 |
| N-Bromosuccinimide | 14.0 |
| Citric acid, powder | 23.9 |
| Total | 100.0 |

Tabletted as described in Example XVIII at 6000 p.s.i. and tested as described in Example I, a single tablet floated and disintegrated rapidly, delivering to the air space 1 p.p.m. of available bromine in 30 seconds and 6 p.p.m. in 10 minutes.

EXAMPLE XXVIII

A composition of the invention was prepared by blending thoroughly the following ingredients in the proportions indicated:

| Ingredients: | Parts by weight |
| --- | --- |
| Base formula | 62.1 |
| Trichloromelamine | 14.0 |
| $N$-$P_2O_5$ | 23.9 |
| Total | 100.0 |

Tabletted as described in Example XVIII at 6000 p.s.i. and tested as described in Example I, a single tablet floated and disintegrated rapidly, delivering to the air space 1 p.p.m. of available chlorine in 30 seconds and 6 p.p.m. in 10 minutes.

EXAMPLE XXIX

A composition of the invention was prepared by blending thoroughly the following ingredients in the proportions indicated:

| Ingredients: | Parts by weight |
| --- | --- |
| Base formula | 7.0 |
| Chloramine T | 2.5 |
| $N$-$P_2O_5$ | 0.5 |
| Total | 10.0 |

Tabletted as described in Example XVIII at 10,000 p.s.i. and tested as described in Example I, a single tablet floated and disintegrated rapidly, delivering to the air space 4 p.p.m. of available chlorine in 30 seconds and 11 p.p.m. in 10 minutes.

EXAMPLE XXX

A composition of the invention was prepared by thoroughly blending the following ingredients in the proportions indicated:

| Ingredients: | Parts by weight |
| --- | --- |
| Potassium dichloroisocyanurate | 8.31 |
| $NaHCO_3$, powder | 13.00 |
| Citric acid, powder | 8.15 |
| Citric acid, fine granular | 8.15 |
| Microcel E | 1.50 |
| NaCl, microsized | 4.10 |
| Polyethylene, powder | 28.69 |
| Cab-O-Sil | 3.50 |
| Carboxymethyl hydroxyethyl cellulose 37M, —70 mesh | 4.50 |
| Drierite, —40 mesh | 14.60 |
| Sodium stearate | 4.50 |
| Lithium stearate | 1.00 |
| Total | 100.00 |

Tabletted as described in Example XVIII at 7000 p.s.i. and tested as described in Example I, a single tablet floated and disintegrated rapidly delivering to the air space 1 p.p.m. of available chlorine in 30 seconds and 7 p.p.m. in 10 minutes.

One tablet added to 5 ml. of water delivered to the air space 2 p.p.m. of available chlorine in 30 seconds and 24 p.p.m. in 10 minutes. One tablet added to 5 ml. of water containing 0.12 g. of citric acid (pH=2.2) delivered to the air space 4 p.p.m. of available chlorine in 30 seconds and 38 p.p.m. in 10 minutes.

EXAMPLE XXXI

A composition of the invention was prepared by thoroughly blending the following ingredients in the proportions indicated:

| Ingredient: | Weight percent |
|---|---|
| HTH, fines | 3.50 |
| HTH, Lobax | 3.50 |
| $NaHCO_3$, powder | 13.00 |
| Citric acid, fine granular | 8.15 |
| Citric acid, powder | 8.15 |
| Microcel E | 1.50 |
| Microsized salt | 4.10 |
| Microthene FN 500 (polyethylene) | 30.00 |
| Cab-O-Sil M-5 | 3.50 |
| CMHEC (−70 mesh) | 4.50 |
| Drierite (−40 mesh) | 14.60 |
| Sodium stearate | 4.50 |
| Lithium stearate | 1.00 |
| Total | 100.00 |

Tablets of the above composition containing HTH as available chlorine source were prepared as described in Example XVIII at 7000 p.s.i. and compared with the tablets of Example XXX containing potassium dichloroisocyanurate as available chlorine source in their effectiveness when added to 5 ml. of water in a 5 liter flask containing 8 p.p.m. of hydrogen sulfide in the air space. The tablet of Example XXX required 120 seconds to eliminate the $H_2S$ whereas the tablet of Example XXXI required only 30 seconds. This shows the more rapid action of calcium hypochlorite in eliminating this odor as compared with potassium dichloroisocyanurate.

EXAMPLES XXXII–XXXIII

Repetition of the procedure of Example XVIII substituting one of the following available chlorine compounds for lithium hypochlorite produced similar results:

| Example No.: | Available chlorine compound |
|---|---|
| XXXII | 1,3-dichloro-5,5-dimethylhydantoin. |
| XXXIII | N,N′-dichlorobenzoylene urea. |
| XXXIV | Dichloramine T. |
| XXXV | Magnesium hypochlorite. |
| XXXVI | Barium hypochlorite. |
| XXXVII | Chlorinated trisodium phosphate (3.2% NaOCl. |

What is claimed is:

1. A solid deodorizing composition reactive with water to generate and deliver a halogenous deodorizing gas into the air space above a body of water into which said composition is introduced and on which said composition floats, said composition consisting essentially of an intimate mixture of the following ingredients in particulate form:

(1) A solid source of available halogen selected from the group consisting of chlorine and bromine;
(2) A solid gas-generating source non-reactive with said solid source of available halogen but reactive with water to generate a gas; and
(3) a solid polymeric olefin selected from the group consisting of polyethylene, polypropylene, polybutadiene and solid copolymer of said polyolefins.

2. A composition as claimed in claim 1 in which said solid source of available halogen is a solid alkaline earth metal hypochlorite.

3. A composition as claimed in claim 1 in which said gas-generating source comprises an alkali metal or alkaline earth metal carbonate or bicarbonate and a solid acid or acid salt.

4. A composition as claimed in claim 1 in which the proportions of sai dingredients by weight are:
(1), from 1 to 40 percent;
(2), from 5 to 50 percent; and
(3), from 10 to 50 percent;
total, 100 percent.

5. A composition as claimed in claim 1 in which said composition is in tablet form.

6. Method of deodorizing the air space above a body of water which consists in introducing into said body of water a composition as claimed in claim 1.

7. A composition as claimed in claim 2 in which said hypochlorite is calcium hypochlorite.

8. A composition as claimed in claim 3 in which said carbonate is sodium carbonate.

9. A composition as claimed in claim 3 in which said acid is an organic acid.

10. A composition as claimed in claim 9 in which said organic acid is citric acid.

11. A composition as claimed in claim 4 in which said ingredient (1) is an alkali metal hypochlorite or an alkaline earth metal hypochlorite.

12. A composition as claimed in claim 4 in which said ingredient (3) is polyethylene or polypropylene.

13. A composition as claimed in claim 4 in which said ingredient (1) is calcium hypochlorite, said ingredient (2) is a mixture of citric acid and sodium bicarbonate and ingredient (3) is a solid polymeric ethylene.

14. A composition as claimed in claim 5 in which all the particles of said ingredients, prior to pressing into tablets, pass 30 mesh and at least 10 percent by weight of said particles pass 100 mesh.

15. A composition as claimed in claim 11 in which said hypochlorite is calcium hypochlorite.

References Cited

UNITED STATES PATENTS

| 3,120,378 | 2/1964 | Lee et al. | 252—95 |
| 3,208,936 | 9/1965 | Hamilton | 252—1 |
| 3,234,141 | 2/1966 | Robson | 252—95 XR |
| 3,318,815 | 5/1967 | Remler et al. | 252—95 |
| 3,359,206 | 12/1967 | Cratsa | 252—92 |

OTHER REFERENCES

Rose et al.: Chemical Dictionary, 6th ed, 1961, pp. 911 and 917.

MAYER WEINBLATT, *Primary Examiner.*

U.S. Cl. X.R.

252—1, 90, 95, 99, 157, 160, 350